's Patent [19]

Epple

[11] Patent Number: 4,997,960
[45] Date of Patent: Mar. 5, 1991

[54] PREPARATION OF 1-AMINO-2-CHLORO-4-HYDROXYAN-THRAQUINONE

[75] Inventor: Gerhard Epple, Weisenheim, Fed. Rep. of Germany

[73] Assignee: BASF Aktiengesellschaft, Ludwigshafen, Fed. Rep. of Germany

[21] Appl. No.: 403,927

[22] Filed: Sep. 7, 1989

[30] Foreign Application Priority Data

Sep. 27, 1988 [DE] Fed. Rep. of Germany ....... 3832740

[51] Int. Cl.$^5$ .............................................. C07C 97/24
[52] U.S. Cl. .................................................... 552/244
[58] Field of Search .......................................... 552/244

[56] References Cited

U.S. PATENT DOCUMENTS 3,631,074 12/1971 Bien et al. .......................... 552/244

FOREIGN PATENT DOCUMENTS 1046522 10/1966 Canada .
1199279 3/1966 Fed. Rep. of Germany .
1215283 4/1966 Fed. Rep. of Germany .
2163059 6/1973 Fed. Rep. of Germany .

Primary Examiner—Richard L. Raymond
Assistant Examiner—Raymond Covington
Attorney, Agent, or Firm—Keil & Weinkauf

[57] ABSTRACT

1-Amino-2-chloro-4-hydroxyanthraquinone (I)

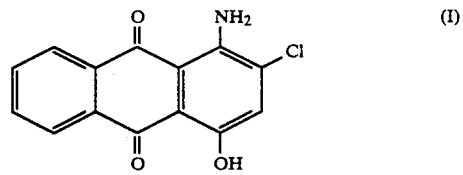

in prepared by chlorinating 1-amino-4-hydroxyanthraquinone (II)

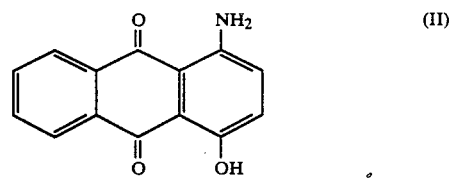

by a process in which the chlorination is carried out in 90–100% strength by weight sulfuric acid or in not more than 2% strength by weight oleum.

9 Claims, No Drawings

PREPARATION OF 1-AMINO-2-CHLORO-4-HYDROXYANTHRAQUINONE

DE-A 2 163 059 discloses that (I) can be prepared by cyclization of 3'-nitro-4,-chlorobenzoylbenzoic acid with boric acid and oleum followed by reduction of the nitro group. However, this process necessitates expensive purification of the product, and the yields of (I) are unsatisfactory.

According to DE-A 1 215 283, (I) can be prepared by oxidation of (II) with manganese dioxide to give the corresponding quinoneimine and a subsequent addition reaction with hydrogen chloride.

JP-B 42631/1981 describes the preparation of (I) by chlorination of a mineral acid salt of (II) in an inert organic solvent. Furthermore, DE-B 1 199 279 discloses that the 5-position and the 8-position of (II) can be chlorinated in a medium containing sulfuric acid, in the presence of boric acid. However, the selective chlorination of the 2-position presents problems since dichlorinated products are generally formed.

Since the conventional processes are unsatisfactory with regard to purity and yields, it is an object of the present invention to remedy these deficiencies.

We have found that this object is achieved by the process of the present invention.

The present invention relates to a process for the preparation of 1-amino-2-chloro-4-hydroxyanthraquinone (I) by chlorinating 1-amino-4-hydroxyanthraquinone (II), wherein the chlorination is carried out in 90-100% strength by weight sulfuric acid or in not more than 2% strength by weight oleum.

1-Amino-4-hydroxyanthraquinone (II) is known and is obtainable by known processes, for example by reacting 1,4-diaminoanthraquinone with manganese dioxide in sulfuric acid. For most purposes, it is sufficient to use technical grade (II) (purity 95% by weight).

The sulfuric acid or the oleum serves as a solvent for (II) and is preferably used in amounts of from 5 to 20, in particular from 6 to 12, kg per kg of (II). The concentration of the sulfuric acid is 90-100, preferably 92-98, % by weight. The residue to 100% is water.

Oleum, ie. a solution of sulfur trioxide in anhydrous sulfuric acid, is also suitable, and the SO3 concentration may be up to 2% by weight.

The chlorinating agent used is preferably chlorine, but the sodium salt of dichloroisocyanuric acid and chlorinated lime are also suitable.

If chlorine is used as the chlorinating agent, the reaction can be accelerated by the presence of a chlorination catalyst, such as iron(III) chloride or manganese dioxide.

The chlorinating agent and (II) are preferably used in stoichiometric amounts but, in order to accelerate the reaction, it may also be advisable to use the chlorinating agent in an excess of not more than about 20 mol eq. %. On the other hand, an excess of (II) above the stoichiometric amount, for example to increase the selectivity of (I), is less advisable from the point of view of working up the reaction mixture.

In general, the chlorination is carried out at from 20 to 100° C., preferably from 40 to 75° C.

The process is carried out in general by initially taking a solution of (II) in sulfuric acid or oleum, adding the chlorinating agent at the reaction temperature and if necessary increasing the temperature as the reaction progresses.

The reaction can be carried out by the conventional methods, also continuously, for example in a stirred kettle cascade.

The course of the reaction is advantageously monitored by thin-layer chromatography. When more than 97% of (II) have been converted, the reaction is generally terminated by pouring the reaction mixture either onto water or onto an aqueous sodium bisulfite solution or by slowly diluting the reaction mixture with water.

The solid which has precipitated during this procedure filtered off and washed with water. As a rule, it contains from 90 to 95% by weight of (I). The residual amount consists mainly of unconverted (II), whereas the amount of the undesirable dichlorinated products is negligible in practice.

1-Amino-2-chloro-4-hydroxyanthraquinone (I) is known to be an important intermediate in the preparation of anthraquinone dyes, for example of Disperse Red 60 and Disperse Red 91.

EXAMPLE 1

3 g of anhydrous iron(III) chloride were added at to a solution, prepared at 20-25° C, of 158 g of 1-amino-4-hydroxyanthraquinone (95% strength by weight) in 1500 g of 96% strength by weight sulfuric acid. Thereafter, chlorine was passed through until only traces of the starting compound (II) were still detectable by thin-layer chromatography. The reaction mixture was then added to a solution of 45 g of sodium bisulfite and 5000 g of water. The precipitated reaction product was filtered off and washed with water.

174 g of a product containing 93% by weight of (I) were obtained, corresponding to a yield of 94% of theory.

EXAMPLE 2

16 g of the Na salt of dichloroisocyanuric acid were added in the course of 15 minutes at 60° C. to a solution, prepared at 20-25° C., of 30 g of 1(95% strength by weight) in 300 g of 96% strength by weight sulfuric acid. The mixture was then stirred for 1 hour at 60° C., after which it was added to 1000 g of water. The reaction product was worked up similarly to Example 1.

34 g of a product containing 89% by weight of (I) were obtained, corresponding to a yield of 93% of theory.

EXAMPLE 3

2 g of anhydrous iron(III) chloride were added to a solution of 50 g of 1-amino-4-hydroxyanthraquinone (94.5%.. strength by weight) in 300 g of 96% strength by weight sulfuric acid. Chlorine was passed in at 60° C until only traces of the starting compound (II) were still detectable by thin-layer chromatography. 2 g of sodium bisulfite were then added and 84 g of water were added dropwise at 60-80° C. After cooling to room temperature, the precipitated reaction product was filtered off with suction and washed with 250 g of 60% strength by weight aqueous sulfuric acid and then with water.

54.6 g of a product containing 95.2% by weight of (I) were obtained, corresponding to a yield of 96% of theory.

I claim:

1. In a process for the preparation of 1-amino-2-chloro-4-hydroxyanthraquinone (I)

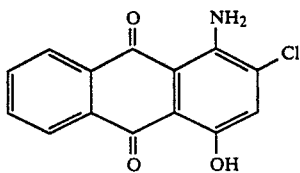

by chlorinating 1-amino-4-hydroxyanthraquinone (II)

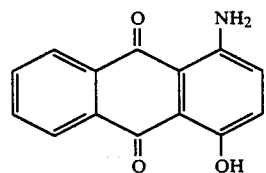

the improvement that the chlorination is carried out in 90–100% strength by weight sulfuric acid or in not more than 2% strength by weight oleum.

2. A process as defined in claim 1, wherein the weight of sulfuric acid or oleum used is from 5 to 20 times the weight of (II).

3. A process as defined in claim 1, wherein the weight of sulfuric acid or oleum used is from 6 to 12 times the weight of (II).

4. A process as defined in claim 1, wherein the chlorination is carried out at from 20° to 100° C.

5. A process as defined in claim 2, wherein the chlorination is carried out at from 20° to 100° C.

6. A process as defined in claim 3, wherein the chlorination is carried out at from 20° to 100° C.

7. A process as defined in claim 1, wherein the chlorination is carried out at from 40° to 75° C.

8. A process as defined in claim 2, wherein the chlorination is carried out at from 40° to 75° C.

9. A process as defined in claim 3, wherein the chlorination is carried out at from 40° to 75° C.

* * * * *